United States Patent
Totsuka

[19]
[11] Patent Number: 6,051,266
[45] Date of Patent: Apr. 18, 2000

[54] METHOD FOR ROASTING GRANULAR MATERIAL AND AN APPARATUS THEREFOR

[75] Inventor: Hiroshi Totsuka, Gunma-ken, Japan

[73] Assignee: IC Electronics Industry Co., Ltd., Gumma-ken, Japan

[21] Appl. No.: 09/134,948

[22] Filed: Aug. 17, 1998

[30] Foreign Application Priority Data

Aug. 22, 1997 [JP] Japan .................................. H9-240199

[51] Int. Cl.⁷ .............................. A23L 1/00; A23N 12/00
[52] U.S. Cl. .............................. 426/466; 99/286; 99/474; 99/483; 426/467
[58] Field of Search .................................. 426/466, 467, 426/520; 99/286, 323.5, 474, 483; 34/576, 586

[56] References Cited

U.S. PATENT DOCUMENTS 5,068,979  12/1991  Wireman et al. ........................ 99/483
5,564,331  10/1996  Song ........................................ 99/483
5,735,194   4/1998  Cochran .................................... 99/474

FOREIGN PATENT DOCUMENTS 5-507841  11/1993  Japan .

*Primary Examiner*—George C. Yeung
*Attorney, Agent, or Firm*—Bacon & Thomas

[57] ABSTRACT

A method for roasting granular material, such as nuts and coffee beans, and an apparatus therefor where the granular material is roasted with the aid of a mortar-shaped roast pan. The roast pan itself is heated up by hot air which is introduced into a hollowed portion of the pan and further the hot air is sent onto the surface of the roast pan through gaps provided at the bottom portion of the pan at an inclined angle compared to the radial direction of the pan. The granular material is roasted in an effective manner both by the heat radiated from the roast pan itself and by the heat of the hot air sent onto the surface of the pan, while being woven on the roast pan by the hot air sent at the inclined angle.

15 Claims, 4 Drawing Sheets

METHOD FOR ROASTING GRANULAR MATERIAL AND AN APPARATUS THEREFOR

BACKGROUND OF THE INVENTION

1) Field of the Invention

The present invention relates to a method for roasting granular material, such as nuts and coffee beans, and an apparatus therefor. According to the invention, the granular material can be roasted evenly and in a short time.

2) Prior Art

When roasting granular material, such as coffee beans, it is important to heat the material up to a desired temperature speedily and in an even manner in order to obtain a highly rated taste and flavor. Hitherto, a drum type roaster or a jet stream type roaster is well known for roasting such granular material. In the drum type roaster, the material is put in a drum which lays down on a heat source in a horizontal direction and the material is rotated in the drum to be roasted; while in the jet stream type roaster, the material is roasted in a funnel-shaped container into which hot air is introduced from the bottom thereof so that the granular material is gyrated in an up and down direction to be roasted.

The drum type roaster has the advantage that the material can be heated up in an even manner because the material is rotated in the container. However, since the heat source is provided beneath the drum-shaped container that lies down in a horizontal direction and the container is rotated to agitate the material, the driving apparatus for rotating the container becomes large. Further, the heat cannot be effectively transferred between the granular material and the heat source so that it takes a long time to roast the material. Furthermore, according to the drum type roaster, it is necessary to incline the drum container in order to pick the material up after roasting. Therefore, another apparatus for inclining the drum container is required in addition to the apparatus for rotating the container. It takes power and time to incline such a big and heavy drum container, and the material is pyrolized during when the roasted material is picked up from the container. Then, the taste and flavor of the material becomes deteriorated.

On the other hand, in the jet stream type roaster, where the material is put in an upright type funnel-shaped container and roasted by hot air introduced through an opening provided at the lower end of the container, has the problem that the heating effect is poor and thus the roasting speed is slow. Because, in such type of roaster, when the material is blown from the bottom to up, the hot air strongly blows against the material, while, when the material goes down, the hot air hardly catches the material. In addition, in the jet stream type roaster, each piece of the material (beans) is floated in a random manner in the container and therefore the material cannot be roasted evenly.

There is another type of roaster where hot air is blown against the material from an upper side. However, in such an apparatus, the material flies in a container if a necessary amount of air to heat up the material is blown rapidly, and the floating material does not catch the hot air well. Therefore, the heating effect is also poor and the material cannot, be roasted evenly.

Roasting is to heat a material up to a temperature at which a chemical reaction begins in that the material is changed into a desired pyrolized condition; the chemical reaction is caused during the last period of a heating cycle of the material to cause the chemical reaction. In case of coffee beans, for example, the taste of coffee liquid extracted from roasted beans depends remarkably upon the time period until the temperature goes up to the last step. Therefore, the time period of heating up is very important for roasting coffee beans. In accordance with the recent study, it is recognized that if coffee beans are heated up to a desired temperature in a time as short as possible, an expansion rate of the beans becomes highest and that more amount of liquid coffee can be obtained from such well-expanded beans. In addition, it is known that the taste of the liquid coffee extracted from beans which have been roasted in a short, time is more delicious in comparison to liquid coffee extracted from beans which is roasted taking a longer time. However, if the roasting temperature becomes higher than 240° C. essential oil goes out from the beans and then the taste of the coffee liquid becomes bad. Therefore, in order to obtain a highly qualified taste and flavor, it is necessary to make such that the beans catches hot air as much as possible. That is to say, it is required to evenly blow hot air against the beans in an even manner with a high speed.

SUMMARY OF THE INVENTION

In order to solve the problems of the above-mentioned prior arts, the present invention has for its purpose to provide a method for roasting granular material and an apparatus therefor. According to the invention, heating and agitating are conducted at the same time while keeping the material in a highly densified condition to roast the granular material.

The method for roasting granular material according to the present invention wherein granular material is roasted with the aid of a mortar-shaped roast pan comprises the following steps: heating the mortar-shaped roast pan itself; introducing hot air along with a surface of said roast pan from a bottom thereof; roasting said granular material both by a heat given from said roast pan itself and by the hot air introduced onto said surface of the roast pan.

When the granular material is roasted in such a way, it is possible to give both the heat transferred via the roast pan itself and the hot air sent from the bottom of the outer surface of roast pan to the granular material, so that the material can be roasted in an effective manner. Since a mortar-shaped roast pan is used, the material always collects to the bottom portion of the pan thereof by its own-weight. Therefore, the material is always made to contact with the surface of the roast pan but not floated therefrom and keeps its condition to be densified together, so that the heat is effectively transferred to the material in an effective manner and thus rapid and even roasting can be realized speedily and evenly. Further, the mortar-shaped roast pan has a wider roasting area in comparison to the drum type roaster or the jet-stream type roaster, while it is possible to keep the size of the apparatus as a whole compact.

It is preferred to send hot air to the surface of the roast, pan using the same heat source as that for heating up the roast pan itself. According to this, the manufacturing cost and the running cost for the roasting apparatus can be reduced and the size of the apparatus as a whole can be made more compact.

The method according to the invention has a further character that said hot air is sent to the surface of the roast pan at an inclined angle compared the radial direction of said mortar-shape of the pan so that the granular material is spun and agitated on the surface of the roast pan. Further, it is preferred to arrange to stop the hot air at a plurality of points at the circumference of the bottom portion of the pan. According to this arrangement, the granular material is spun on the surface of the roast pan, weaving thereon, so that the material can be roasted in an even manner.

The present invention has another purpose to provide a roaster for roasting granular material which comprises a mortar-shaped roast pan, a plurality of openings for blowing hot air onto the surface of said roast pan being provided at a bottom of said roast pan, a heating means for heating said roast pan, a blast means for blowing hot air into said roast pan through said openings.

According to the roaster, thermal radiation from the surface of the roast pan and a direct heating by the hot air blowing from the openings can be given to the material simultaneously, so that the material can be roasted in a short time. Further, since the mortar-shaped roast pan is used, the material always tends to be collected in the bottom direction thereof, but hot air is blown to the pan along the surface thereof, the material is not floated up from the surface of the pan. That is to say, the material is roasted in a state to keep its condensed condition together and therefore the material is roasted in an effective manner.

Furthermore, the roaster according to the present invention has a feature in that the roast pan comprises an upper plate member which comprises an opening at its bottom portion and a lower plate member which comprises an opening at its bottom portion, wherein a hollow structure is formed by these upper and lower plate members; further there are provided an upper cap and a lower cap to said upper and lower openings, respectively and the upper cap comprises a plurality of fins so as to form openings for blowing hot air and making the direction to blow the hot air; and furthermore, the lower cap is constituted in such a manner that the lower opening provided on the lower plate member is able to be closed.

As mentioned above, the roast pan of the roaster according to the present invention has an inflatable structure and the pan is heated up by sending hot air into the cavity thereof; the hot air is further introduced to the surface of the roast pan. Therefore, the roast pan per se is heated up by a heat source and the hot air heated up by the same source is sent into the pan. Furthermore, since the pan has a hollow structure, the pan apt not to be cooled down and thus continuous roasting can be done in an effective manner by using the afterheat of the roast pan.

The roster according the present invention further comprises a cap moving means for moving the upper and lower caps integrally in an upper and lower direction. According to the apparatus, when moving the tipper and lower caps to an upper direction there are provided openings between the upper and lower plate members and the upper and lower caps, respectively, so that the granular material can be taken out from the openings easily. Furthermore, the roaster provides a cooling means for cooling the roasted granular material, and a connecting means for connecting the opening for taking out the material and the cooling means, so that when the caps are moved to the upper direction, the roasted granular material is smoothly introduced to the cooling means.

In this manner, according to the invention, an opening is formed when the cap provided at the bottom portion of the pan is lifted up, and the granular material can be taken out from the opening. Therefore, the material can be transferred from the roast pan to the cooling means easily.

It may be possible to arrange such that the roaster further comprises a closing means for closing the cavity of the hollow structure of the pan so as to stop to introduce the hot air into the pan, which is sent from the hollow structure. In this case, when the caps are moved to an upper direction, that is to say, during when the granular material is taken out from the pan, it is stopped to introduce the hot air into the pan. Therefore, the material can be easily taken out from the pan without stopping the hot air supply from the heat source.

Furthermore, in the roaster according to the present invention, a plurality of fins are provided on the upper cap in a equidistant manner around the circumference of the upper cap and the fins are located so as to form an inclined angle compared to the radial direction of the roast pan, so that, the hot, air is blown along the surface of the roast pan in a perspective manner with respect to the radial direction of the pan.

According to the roaster, the hot air is blown from the bottom portion of the roast pan in a perspective direction with respect to the radial direction of the roast pan, so that the material turned out in the pan by the hot air. While, since the roast pan has a mortar shape, the granular material is apt to be collected by the deadweight thereof so that the material is turned on the surface of the pan keeping the comparatively densified condition thereof. Therefore, the coefficient of heat conductivity is improved and the material can be roasted speedily and evenly.

It is preferred to close some part of the openings for blowing hot air so as not allow sending hot air to the pan from the closed part. In case of arranging to vary the blow of the hot air by closing some part of the opening for blowing the air, the granular material can be turned on the surface of the pan meandering and thus the material can be agitated in a preferred manner and roasted evenly.

DETAILED EXPLANATION OF THE PREFERRED EMBODIMENT

Preferred embodiments of the roasting method and the roaster according to the present invention will be explained below, referring to the attached drawings.

Figure 1:
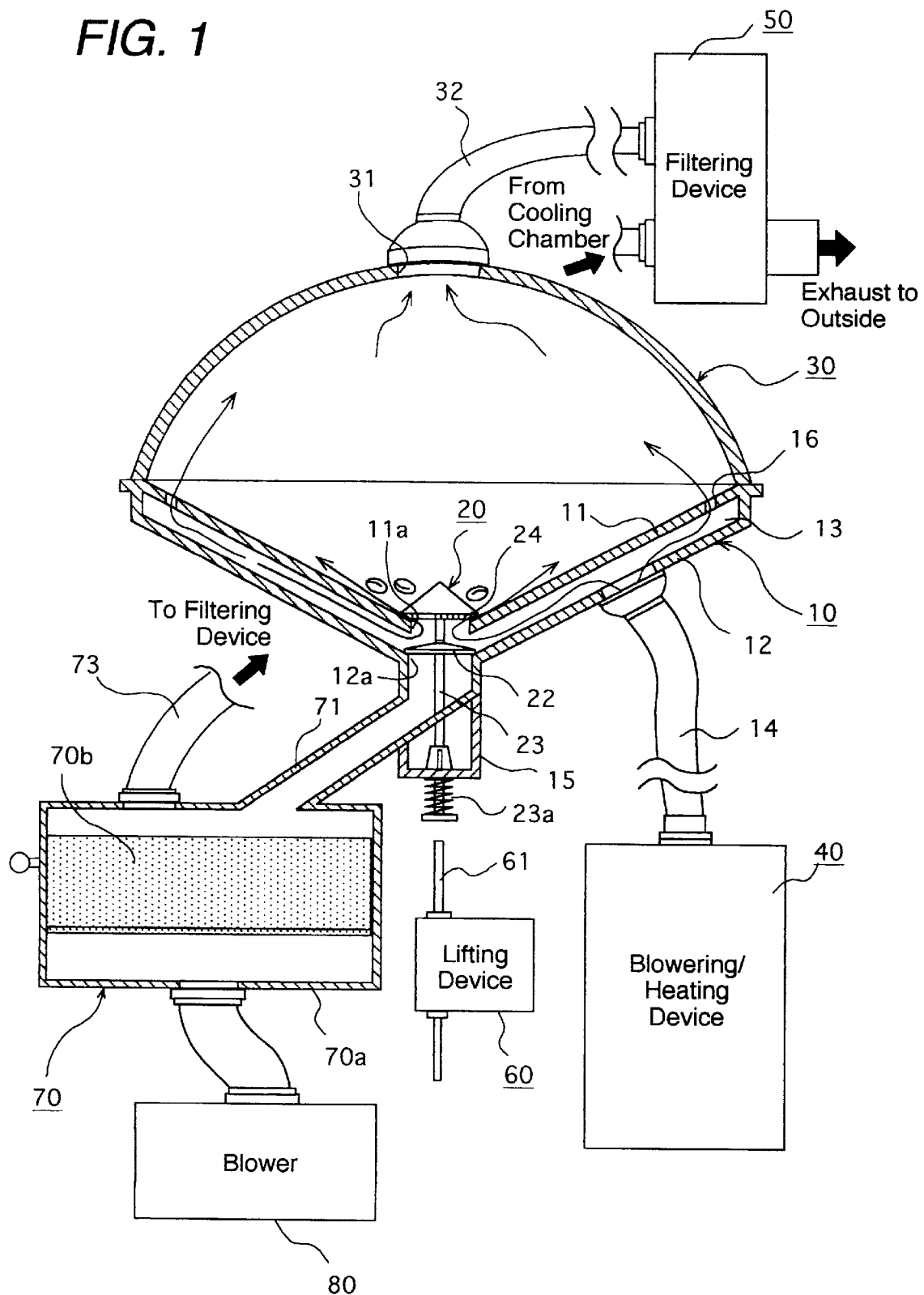
FIG. 1 is a partial cross-sectional view showing a construction of an embodiment of the roaster for roasting granular material according to the present invention.

FIG. 1 shows a whole construction of the roaster according to the present invention. As shown in FIG. 1, the roaster comprises a roast pan 10, a center cap 20 which is arranged at a bottom portion of said roast pan 10, a cover 30 for covering the roast pan 10, a blowing/heating device 40 for heating the roast, pan 10, a filtering device 50 for removing thin skin of the material, a moving device for lifting up and lowering down the center cap 20, and a cooling device 70 for cooling down the roasted material.

The roast pan 10 comprises a hollowed-structure composed of an inner plate 11 (roaster table) and an outer plate 12 (roaster plate). A duct 15 is connected to a side of the outer plate 12 so as to introduce hot air into the hollowed portion (heating region) 13 of the pan from the blowing/ heating device 40.

The center cap unit 20 comprises an upper cap 21 and a lower cap 22. These caps are connected together by a shaft 23. The center cap unit 20 works such that during when sending the hot air into the pan 10 the upper cap 21 closes an opening 11a provided in the bottom of the inner plate 11 of the roast, pan 10 and the lower cap 22 closes a opening 12a provided in the bottom of the outer plate 12. There are arranged a plurality of fins around the lower surface of the upper cap 21, so that when the upper cap 21 closes the opening 11a of the inner plate 11a plurality of blast holes through which the hot air is introduced onto the surface of the roaster table 11 are formed. On the other hand, the lower cap 22 tightly closes the opening 12a of the outer plate 12, so that the hot air coming from the heating region 13 does not leak outside.

The center cap 20 is usually being pulled to a lower direction by its own weight and a spring 23a, which is provided below the shaft 23, however, it is able to be lifted up by moving the shaft 23 in an upper direction by the lifting device 60.

Figure 2:
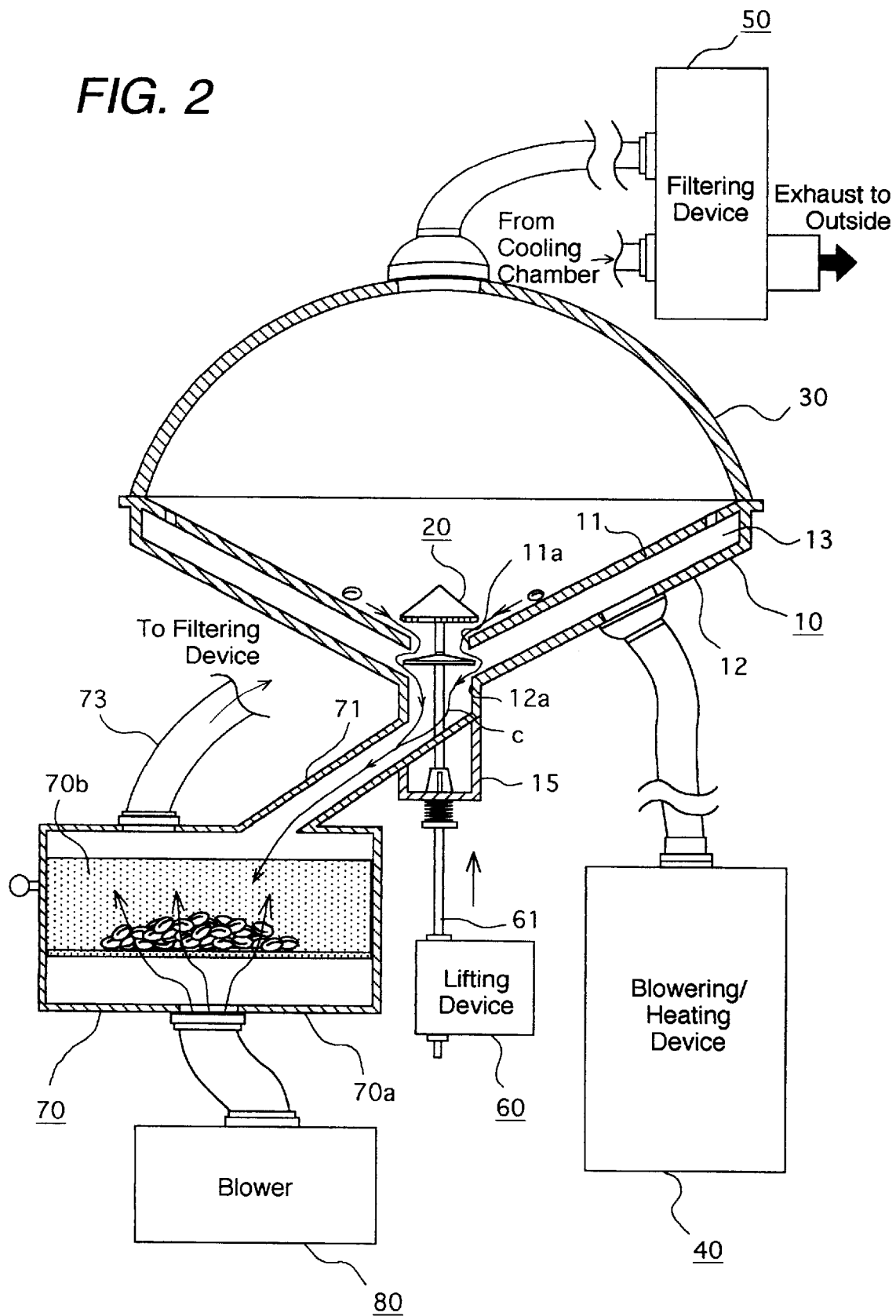
FIG. 2 is a partial cross-sectional view showing a condition that a center cap of the roaster shown in FIG. 1 is lifted up.

FIG. 2 illustrates a condition of the roaster where the center cap unit 20 is lifted up. When the shaft 23, is lifted up, the upper cap 21 and the lower cap 22 are integrally moved into an upper direction and spaces are formed between the bottoms of the respective caps and the upper and lower plates 11, 12 of the roast pan 10, so that roasted material can be taken out from the pan 10 through the space. A receiver 15 is provided under the opening 12a of the outer plate 12 of the roast pan and the receiver 15 is connected to the cooling device 70 via a duct 71. Therefore, when the center cap 20 is lifted up and the roasted material falls down by its own weight, the material is collected to the cooling device via the duct 71.

The cover 30 for covering the roast pan 10 has a dome-like shape and an exhaust hole 31 at a top of the cover 30. The exhaust hole 31 is connected to the filtering device 50 via a duct 32 to exhaust the heated air in the roast pan 10. The thin skin of the coffee beans, so-called "chaff" or dust is removed by the filtering device 50. It should be noted that a plurality of small holes 16 are formed on the peripheral portion of the roaster table 11 with equidistant spaces in order to keep the airflow of the heating region 13.

The thus constructed roaster works such that hot air is sent from the blowing/heating device 40 to the heating region 13 of the roast pan 10 to heat up the roaster table 11; the hot air is introduced into the roast pan 10 along the front surface of the roaster table 11 via the blast gaps 24 (fins) provided between the center cap 20 and the bottom portion of the table 11. Therefore, the granular material is heated up not only by the radiation heat which is given from the heated roaster table 11 but, also by the hot air directly sent from the hollow 13 via the gaps 24, so that the material can be roasted in an effective manner.

Figure 3:
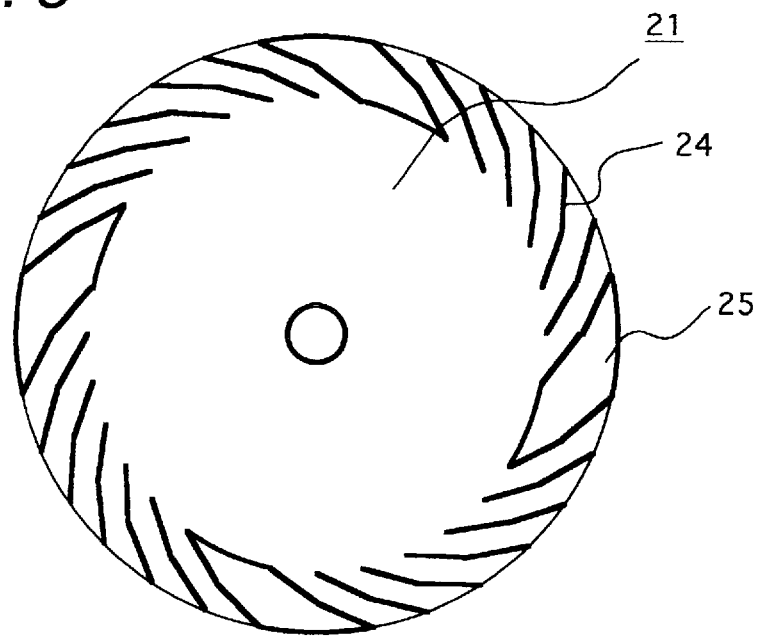
FIG. 3 is a bottom view of the upper center cap of the roaster shown in FIG. 1.

FIG. 3 is a schematic view showing the upper cap 21 of the center cap 20 viewed from the lower direction, from which the arrangement of the fins 24 can be easily understood. As shown in FIG. 3, on the rear side of the upper cap 21, are provided a plurality of fins 24 arranged tangentially with equidistant spaces. Further, there are formed four closing members 25 which are separated from each other so as to be at right angles to each other. It should be noted that the closing members 25 stop the blowing of hot air into the pan 11. Depending upon the direction of the fins 24 and the position of the closing members 25, the blowing direction of the hot air is determined and then the material moves in accordance with the blowing direction. In the present embodiment, as shown in FIG. 3, each fin 24 is bent at its center portion in order to send the hot air into a desired perspective direction effectively.

Figure 4:
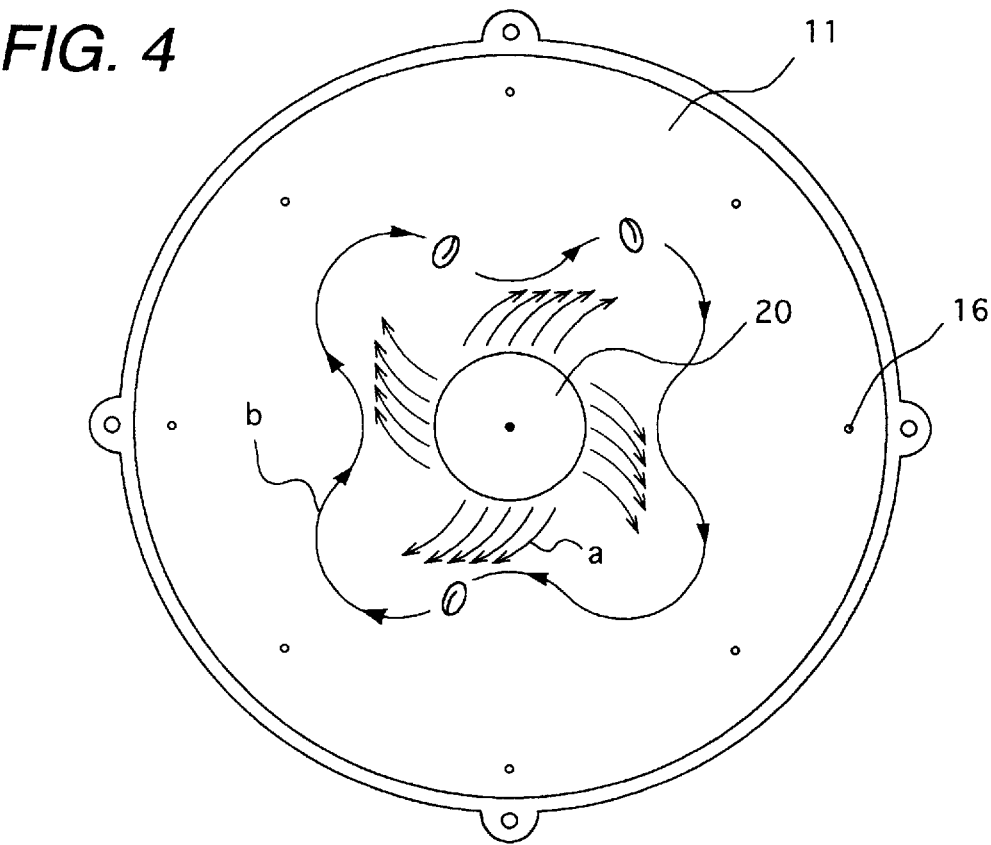
FIG. 4 is a plan view of the roast table (roast pan) of the roaster for roasting granular material according to the present invention.

FIG. 4 depicts how the hot air is blown and the movement of the granular material when the hot air is blown into the pan where the center cap 20 shown in FIG. 3 is attached. The arrows show the blowing direction of the hot air from the bottom. It should be noted that no hot air comes from the portions where closing members 25 are provided. In the vicinity of the hole 24, the granular material moves on the roaster table 11 in a perspective and upper direction with respect to the radial direction thereof according to the hot air coming from the blast hole 24; while, when the material moves to the region where no air comes the material falls down toward the center portion of the table 11 along with the inclination of the table. The material moves on the surface of the table 11 repeating the above mentioned two movements. As a result, the material rotate on the surface of the table 11 with waving and weaving around the center cap 20 as shown by an arrow b in FIG. 4.

Since the roaster table 11 has a mortar-like shape, in the area where no hot air comes, the material being raised in an upper direction by the hot air falls down to the lower direction by its own weight keeping to be brought into contact to the surface of the roaster table 11. Therefore, even when the hot air does not catch to the material directly, the radiation heat coming from the surface of the roaster table 11 is always transmitted to the material, so that the material can be roasted effectively.

In order to roast the material more effectively, it is preferred to agitate the material in such a condition that when the material falls down to the center of the roaster table in the area, where no hot air comes, the material does not float from the surface of the roaster table 11. In addition, if the material moves in a nonscattered condition but is collected together, the heat is transferred between the elements consisting of the material so that the material can be roasted in a shorter time. According to the present invention, such a preferred roasting condition can be realized by adjusting the amount of hot air to be introduced into the pan in accordance with the amount of the material to be roasted.

Furthermore, it is preferred to settle the distance between the adjacent fins and the height of each fin so as to be smaller than the granular material to be roasted. According to such an arrangement, the material does not clog between the center cap 20 and the roast pan 10 before the roasting starts or during the roasting.

After the roasting is completed, the material should be moved to the cooling chamber 70 soon to be cooled down. Just after the roasting is completed, the temperature in the roast pan 10 is very high. Therefore, if the material is left in the roast pan 10, the material is roasted too much or is burnt due to the after heat. According to the invention, when the lifting device lifts the shaft 23 up and then the upper cap and the lower cap are simultaneously lifted up, spaces are formed between the opening 11a of the inner plate 11 and the upper cap 21 and the opening 12a of the outer plate 12 and the lower cap 22, respectively, through which the material falls down to the cooling container 70 via the duct 71, as shown by the arrow c in FIG. 2. That is to say, according to the invention, the material can be sent to the cooling container 70 just after the roasting has been finished by a simple operation only, i.e. lifting up the center cap 20.

As illustrated in FIG. 1, the shaft 23 is usually physically isolated from the lifting device 60 in order to prevent that electronic equipment for driving the roaster being influenced by the heat from the roast pan 10. The lifting device 60 may be constituted of electric components, for instance, a motor or a solenoid, or mechanical structure for moving the supporting rod 61 up and down.

Figure 5:
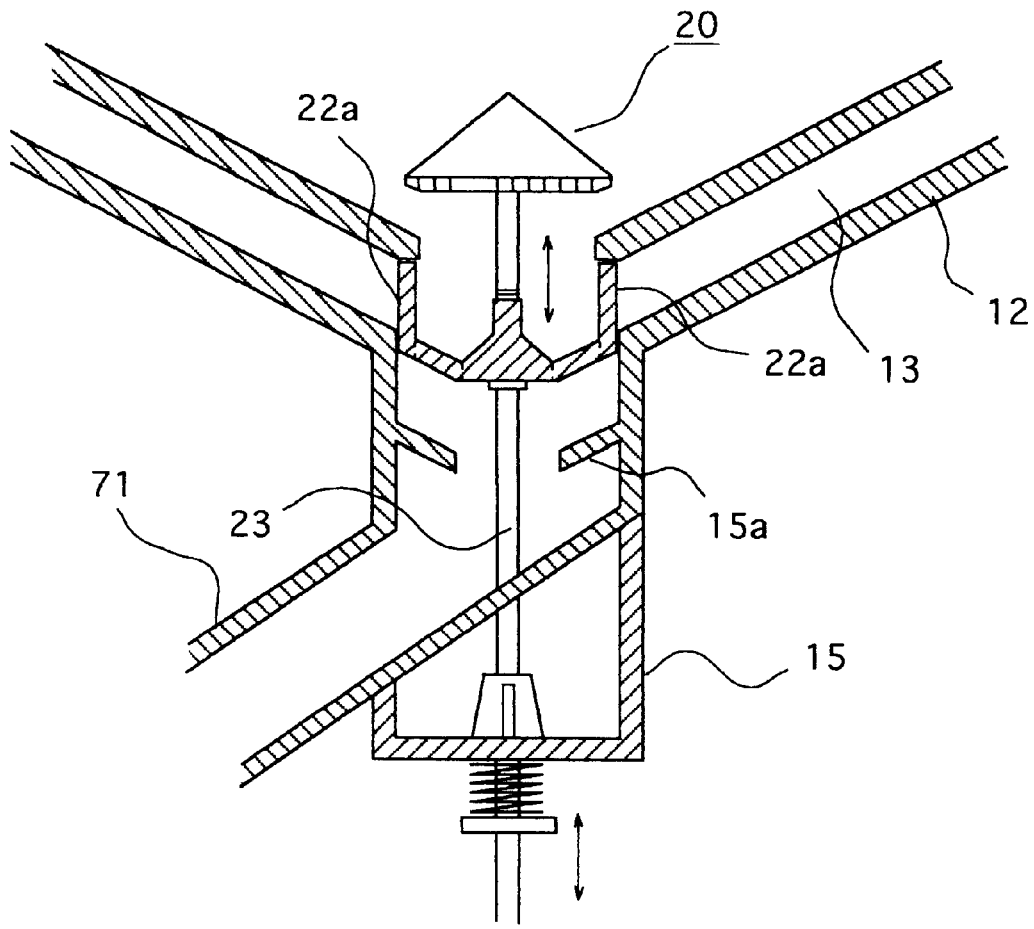
FIG. 5 is a schematic view illustrating another embodiment of the center cap for the roaster for roasting granular material according to the present invention.
Figure 5:
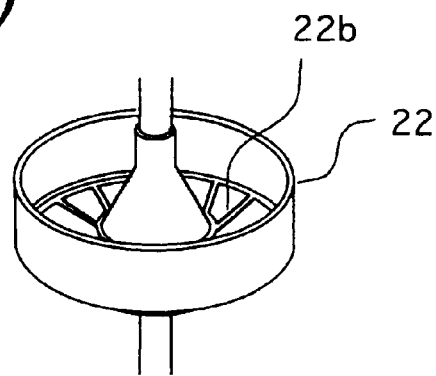

FIG. 5 shows another construction of the center cap 20. As shown in FIG. 5, the lower cap 22 of the center cap 20 comprises a side wall 22a which has the same dimension as the width of the heating region of the hollow structure of the roast pan 10; thus, when the center cap 20 is lifted up, the side wall 22a closes the heating region 13. As shown in FIG. 5(b), there are provided a plurality of openings on the bottom portion of the lower cap 22 through which the roasted material can fall down to the cooling container. The roasted material slips down from the roast pan 10 falls to the receiver 15 through the openings and is then introduced into the duct 71 which connects the receiver 15 and the cooling chamber 70. The bottom portion of the lower cap 22 has a tapered shape which is inclined toward the center, while the receiver 15 provides a lower cap stopper 16a which also inclines the same as the bottom portion of the lower cap 22. The stopper 15a is protruded to the inside of the receiver 15 and thus when the center cap 20 is lowered down, the openings 22b of the lower cap 22 are closed by the stopper 15a, so that the hot air coming from the heating area 13 does not leak outside through the openings 22b.

According to such a construction, when the roasted material is sent to the cooling chamber 70 from the roast pan 10, the heating area 13 is closed by the side wall 22a of the lower cap 22 and thus the hot air does not enter into the pan 10. Therefore, the material can be taken out from the pan while driving the blower/heating device 40. This is useful when roasting is continuous and conducted repeatedly.

As shown in FIG. 1, the cooling chamber 70 comprises a body 70a and a cooling basket 70b which is installed inside the body 70a. The basket 70b is made of a metal plate in which a multiplicity of holes is provided in order to make it drafty. The duct 71 is connected to the body 70a, so that the material, which is brought to the cooling chamber 70 via the pass shown by an arrow c in FIG. 2, is contained in the basket 70b and is cooled down by the air blown from the cooling blower 80, which is provided in a condition that the cool air comes from bottom to top of basket 70. Since the air for cooling the material is blown from below, the heal) of the material is reduced to be flat and thus the material is cooled down in an even manner. It may be possible to arrange to agitate the material in the basket 70b by blowing the cool air more strongly.

An exhaust duct 73 is further provided on the body 70a of the cooling chamber 70. After the roasted material is collected into the chamber 70, the duct 71, which is connected to the roast pan 10, is closed by lowering the center cap 20; therefore the cool air does not stream into the roast, pan 10. The exhausted air going through the duct 73 may be released directly to the outside. However, it may be possible to arrange it so as to mix the cool air with hot air coming from the exhaust opening 31 in order to cool down the temperature of the exhausted hot air and then discharge the mixed cooled down air outside. In this case, the blower device for cooling the material should be driven during the time that the material is roasted in the pan 10.

The present invention is not limited to the above-explained embodiment, but many alternatives or modifications can be considered. The shape and size of the roast pan, how to heat the pan, how to blast the hot air can be modified taking the sort and amount of the material to be roasted, etc. into consideration. The shape and construction of the center cap 20 are not, limited to the above-mentioned embodiments; particularly, the space between the fins or the angle of the fins, or the existence of the closing member 25 can be modified unless the movement eliminated such that the material is rolled on the surface of the roast pan in a comparatively condensed manner but without being floated from the surface.

As explained above, according to the method of the present invention, the granular material is put on the mortar-shaped roast pan and hot air is sent onto the surface of the roast pan at the same time when the pan is heated up from beneath to roast the material. As a result, the material is rolled on the pan to be roasted and then both the heat transmitted via the roast pan and the direct hot, air can be given to the material at the same time, so that the material is roasted quickly.

Further, the hot air is blasted from the center area of the bottom of the roast pan at an inclined angle compared to the radial directions of the pan and there are provided some closed portions from which no hot air is sent, so that the hot air provided onto the surface of the pan is varied and then the material is rolled on the surface in waves. Therefore, the material is roasted effectively being agitated on the pan without being floated from the surface.

Furthermore, the roasted material can fall to the cooling chamber by only a simple action, which is pushing up the center cap. Therefore, the material can be sent to the cooling step very quickly.

What is claimed is:

1. A method for roasting a granular material which is nuts or coffee beans using a mortar-shaped roast pan with a dome-shaped cover, comprising the following steps: heating up said mortar-shaped roast pan itself; introducing the granular material into the mortar-shaped roast pan; sending hot air onto a surface of said roast pan through openings provided in a bottom portion of said pan; roasting said granular material by the heat coming from the roast pan itself and by the hot air being sent from the openings provided in the bottom portion of said pan onto the surface of the roast pan.

2. The method for roasting granular material according to claim 1, wherein said hot air is sent to the surface of the roast pan by using the same heat source as that used for heating the roast pan itself.

3. The method for roasting granular material according to claim 2, wherein said hot air is sent to the surface of the roast pan at an inclined angle to the radial direction of said pan, so that the granular material is rotated and agitated on the surface of the pan during roasting.

4. The method for roasting granular material according to claim 3, wherein said sending of the hot air is stopped at a plurality of portions so that the granular material is rotated and agitated on the surface of the pan while weaving thereon.

5. An apparatus for roasting a granular material which is nuts or coffee beans comprising a mortar-shaped roast pan with a dome-shaped cover, a plurality of openings being provided in a bottom portion of said pan to said hot air onto a surface of said roast pan, a heating means for heating said roast pan, and a blasting means for sending hot air onto said pan through said openings.

6. The apparatus for roasting granular material according to claim 5, wherein said heating means is hot air and wherein the hot air being used for heating up said roast pan is also sent onto said roast pan through said openings.

7. The apparatus for roasting granular material according to claim 6, wherein said roast pan comprises an upper plate member which has an opening on its bottom portion and an lower plate member which has an opening on its bottom portion so that said pan comprises a hollow portion inside thereof, wherein an upper cap is provided in said opening of the upper plate member and a lower cap is provided in said opening of the lower plate member, respectively, wherein a plurality of fins are provided on the peripheral portion of said upper cap so as to form blasting holes through which air can be sent onto said roast, pan, and wherein said lower cap is constructed to be capable in blocking the opening formed in the lower plate member of the roast pan.

8. An apparatus for roasting granular material according to claim 7 further comprising a cap moving means for moving said upper and lower caps integrally in up and down directions, wherein the upper and lower caps are moved in a space formed between the opening of the upper plate member of the roast pan and the upper cap and in a space formed between the opening of the lower plate member of the roast pan and the lower cap, respectively, so that the roasted material is able to be taken up from the pan through the space.

9. The apparatus for roasting granular material according to claim 8, wherein said apparatus comprises a blocking means for closing said hollow portion of the pan when said upper and lower caps are moved in an upper direction so that, hot air is not run out from the hollow portion of the roast pan when said upper and lower caps are moved in an upper direction.

10. The apparatus for roasting granular material according to claim 8 further comprising a cooling device for cooling the roasted granular material down, wherein said cooling device is connected to said lower cap, so that when the upper and lower caps are moved into an upper direction said roasted granular material is introduced into said cooling device.

11. The apparatus for roasting granular material according to any one of claims 5 to 10, wherein said upper and lower caps are isolated from electric wires or members having electric wires thereon at least during when said granular material is heated to be roasted.

12. The apparatus for roasting granular material according to claim 11, wherein a hot air taking means is provided on a surface of the lower member of the roast pan.

13. The apparatus for roasting granular material according to claim 12, wherein said plurality of fins are provided with a common space, and wherein said fins are provided so as to form a given angle with respect to a radial direction of said roast pan, so that the hot air is sent out, onto a surface of said roast pan at an inclined angle compared to the radial direction of the roast pan.

14. The apparatus for roasting according to claim 13, wherein a part of the blasting holes are closed so that no hot air is blasted through the closed holes.

15. The apparatus for roasting granular material according to claim 14, wherein at least three of the blasting holes are closed.

* * * * *